No. 739,234. PATENTED SEPT. 15, 1903.
Z. STORCH.
PUMP.
APPLICATION FILED SEPT. 15, 1902.
NO MODEL.
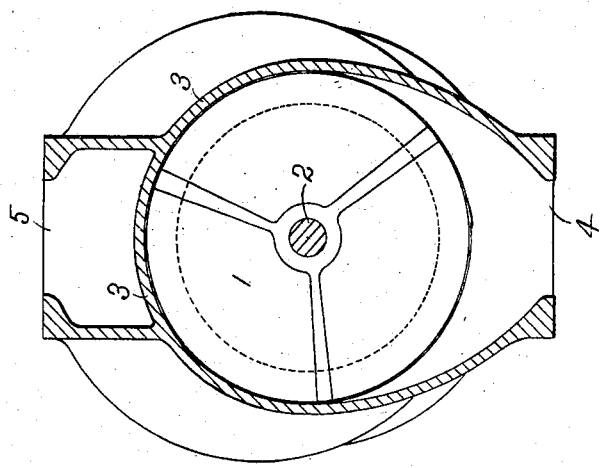
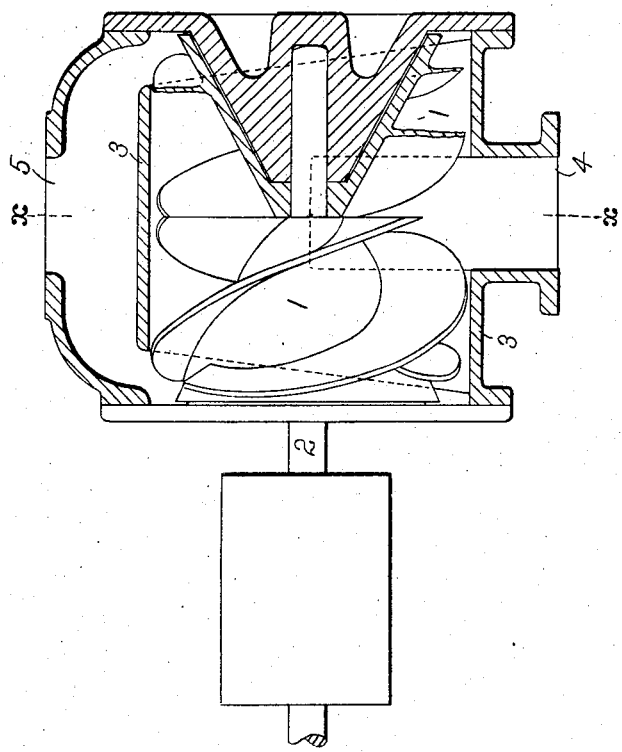
Witnesses: Inventor:
Zdeny Storch
By W. S. Smyth
his atty No. 739,234. Patented September 15, 1903.

UNITED STATES PATENT OFFICE.

ZDENY STORCH, OF ALAMEDA, CALIFORNIA.

PUMP.

SPECIFICATION forming part of Letters Patent No. 739,234, dated September 15, 1903.

Application filed September 15, 1902. Serial No. 123,527. (No model.)

*To all whom it may concern:*

Be it known that I, ZDENY STORCH, a citizen of the United States, residing at Alameda, in the county of Alameda and State of California, have invented certain new and useful Improvements in Pumps; and I do hereby declare the following to be a full, clear, and exact description of the same.

This invention relates to a helical-runner pump. The difficulty heretofore encountered in this type of pump relates to the formation of internal eddies and interfering currents by the rotation of the runner. This is responsible for much of the waste and low efficiency in this type of pump.

The principle upon which the present invention is based is the reduction in the sectional area of a given volume of water in motion in proportion to the speed of flow.

The object of the present invention is therefore to provide a simple, durable, and efficient helical-runner pump upon the principle stated which will avoid the trouble referred to and show a high efficiency by constructing the runner in such a manner that the stream of water impelled thereby shall completely fill the space between the blades at all points during its course through the runner notwithstanding its increasing velocity. Thus as the space allowed for the passage of the water is only sufficient to permit the given volume which enters the runners to pass out at the acquired speed of flow at the eduction end no internal eddies or cross-currents can be formed.

In order to carry out the objects and principles outlined, I construct this pump and its runner substantially as illustrated in the accompanying drawings, in which—

Figure 1 is a sectional elevation showing the pump-runner partly in full. Fig. 2 is a cross-section through X X of Fig. 1.

Referring to the drawings, 1 is a multiple-threaded helix secured upon a shaft 2, the helix being of a continually and progressively diminishing pitch and its hub of conical form. The apex of the conical hub is toward the induction side. I preferably employ two runners, as described, but reversely formed. A suitable casing 3, which incloses the runner, is provided with an intake-pipe 4, located intermediate of its ends. The discharge-pipe 5 may be made, as shown in the drawings, to connect the eduction ends of the double runner to single discharge, as shown.

It will be observed that owing to the diminishing pitch of the blades and to the gradually-increasing diameter of the hub from the induction to the eduction side of the runner the space between the blades of the runner is consequently decreasing in sectional area, the decrease being proportioned to the increase of speed induced in the water during its passage through the pump.

Having now described my invention, what I claim is—

1. A pump comprising a helical runner within a substantially cylindrical casing, the blades of the runner converging toward each other in the direction of the eduction end of the runner.

2. A pump comprising a helical runner having a conical hub within a substantially cylindrical casing, the blades of the runner converging toward each other in the direction of the eduction end of the runner.

3. A pump comprising a helical runner within a substantially cylindrical casing, the blades of the runner converging toward each other in the direction of the eduction end of the runner and a second substantially similar but reversely-formed runner.

4. A pump comprising a helical runner having a conical hub within a substantially cylindrical casing, the blades of the runner converging toward each other in the direction of the eduction end of the runner and a second substantially similar but reversely-formed runner.

5. A pump comprising a helical runner having blades converging toward each other in the direction of the eduction end and a second substantially similar but reversely-formed runner and a substantially cylindrical casing provided with an induction-aperture substantially central of the duplex runner.

6. A pump comprising a helical runner with a conical hub having blades converging toward each other in the direction of the eduction end and a second substantially similar but reversely-formed runner and a substantially cylindrical casing provided with an induction-aperture substantially central of the duplex runner.

7. A pump comprising a helical runner within a suitable casing, the blades of the runner being so formed that the sectional area of the space defined by adjacent blades and the casing continually diminishes from the induction to the eduction end of the runner.

8. A pump comprising a helical runner having a conical hub within a suitable casing, the blades of the runner being so formed that the sectional area of the space defined by adjacent blades, the hub and casing continually diminishes from the induction to the eduction end of the runner.

9. A pump comprising a helical runner within a suitable casing, the blades of the runner being so formed that the sectional area of the space defined by the adjacent blades and the casing continually diminishes from the induction to the eduction end of the runner and a second substantially similar but reversely-formed runner.

10. A pump comprising a helical runner having a conical hub within a suitable casing, the blades of the runner being so formed that the sectional area of the space defined by adjacent blades, the hub and casing continually diminishes from the induction to the eduction end of the runner and a second substantially similar but reversely-formed runner.

11. A pump comprising a helical runner having blades so formed that the sectional area of the space between the adjacent blades continually diminishes from the induction to the eduction end of the runner and a second substantially similar but reversely-formed runner and a substantially cylindrical casing provided with an induction-aperture substantially central of the duplex runner.

12. A pump comprising a helical runner with a conical hub having blades so formed that the sectional area of the space between the adjacent blades continually diminishes from the induction to the eduction end of the runner and a second substantially similar but reversely-formed runner and a substantially cylindrical casing provided with an induction-aperture substantially central of the duplex runner.

ZDENY STORCH.

Witnesses:
D. B. RICHARDS,
JESSE R. EOFF.